(12) United States Patent
Russell et al.

(10) Patent No.: US 9,919,757 B2
(45) Date of Patent: Mar. 20, 2018

(54) BICYCLE AND BICYCLE FRAME

(71) Applicant: Specialized Bicycle Components, Inc., Morgan Hill, CA (US)

(72) Inventors: Douglas Graham Russell, Salinas, CA (US); Todd Cannatelli, Morgan Hill, CA (US); Jamie Stafford, Mountain View, CA (US); Jason McDonald, San Jose, CA (US)

(73) Assignee: SPECIALIZED BICYCLE COMPONENTS, INC., Morgan Hill, CA (US)

( * ) Notice: Subject to any disclaimer, the term of this patent is extended or adjusted under 35 U.S.C. 154(b) by 0 days.

(21) Appl. No.: 15/131,922

(22) Filed: Apr. 18, 2016

(65) Prior Publication Data

US 2016/0304153 A1 Oct. 20, 2016

Related U.S. Application Data

(60) Provisional application No. 62/148,183, filed on Apr. 16, 2015.

(51) Int. Cl.
| | |
|---|---|
| *B62M 1/36* | (2013.01) |
| *B62K 3/02* | (2006.01) |
| *B62K 19/30* | (2006.01) |
| *B62K 19/34* | (2006.01) |

(52) U.S. Cl.
CPC .............. *B62K 3/02* (2013.01); *B62K 19/30* (2013.01); *B62K 19/34* (2013.01)

(58) Field of Classification Search
CPC ................................. B62M 1/36; B62K 3/02

USPC ........................................................ 280/261
See application file for complete search history.

(56) References Cited

U.S. PATENT DOCUMENTS

| 4,770,433 | A * | 9/1988 | Hartmann .............. B62M 11/16 |
| | | | 280/238 |
| 6,066,057 | A * | 5/2000 | Nakamura ............. B62M 9/122 |
| | | | 280/216 |
| 7,771,303 | B2 * | 8/2010 | Fuse ........................ B62M 9/16 |
| | | | 474/111 |
| 8,585,070 | B2 * | 11/2013 | Beale ................... B62K 25/286 |
| | | | 280/284 |
| 8,925,949 | B2 * | 1/2015 | Zecchetto ................ B62K 3/02 |
| | | | 280/281.1 |
| 2011/0018336 | A1 * | 1/2011 | Mercat ..................... B60B 7/01 |
| | | | 301/95.106 |
| 2011/0193316 | A1 * | 8/2011 | Earle .................... B62K 25/286 |
| | | | 280/284 |

(Continued)

FOREIGN PATENT DOCUMENTS

WO 2004005122 1/2004

*Primary Examiner* — Jacob D Knutson
(74) *Attorney, Agent, or Firm* — Michael Best & Friedrich LLP (57) ABSTRACT

A bicycle includes a frame, a front and rear wheel and a crank assembly. The frame includes chainstays and a bottom bracket having a center and which rotationally receives the crank assembly. The crank assembly includes a chain ring having a radius between the bottom bracket center and a circumferential edge. The chainstays are connected to the bottom bracket at a first end and rotationally receive the rear wheel at a second end. The chainstay defines a cutout sized to receive a portion of a circumferential edge of the chain ring.

13 Claims, 6 Drawing Sheets

(56) References Cited

U.S. PATENT DOCUMENTS

2013/0241172 A1\* 9/2013 Deily ................ B62K 3/04
                                                     280/281.1

\* cited by examiner

BICYCLE AND BICYCLE FRAME

BACKGROUND

The present invention relates generally to bicycle systems and frame assemblies. In particular, the present invention relates to a bicycle and frame having a chainstay configured to receive a wide tire in close proximity to a crankset.

Prior art bicycle frames traditionally comprise a plurality of tubes, including a head tube, a top tube, a down tube, a seat tube, chainstays and seat stays. A bottom bracket shell connects the seat tube, down tube and chainstays and receives a bottom bracket. The bottom bracket receives a crankset of a drivetrain for rotational movement. The crankset includes a chain ring configured to engage the chain, and transform forces created by the rider during pedaling into power to drive the rear wheel.

The size, shape and orientation of the tubes may influence not only the size and fit of a bicycle, but they also influence the handling characteristics. For example, altering the length of the chainstays has been shown to correspond to an increase or decrease in responsiveness such that comparatively shorter chainstays tend to increase the responsiveness and maneuverability of a bicycle.

Similarly, tire width may also influence the handling characteristics of a bicycle. Mountain bikes designed for traversing unpaved trails traditionally include tires that have a tread pattern including a number of knobs that project from the tire surface. The pattern and the size of the knobs can vary widely depending upon the discipline of mountain biking for which the tires are designed. Wider tires have a greater surface area to contact the terrain, which tends to provide more stability in comparison with a narrower tire.

While wider tires and shorter chainstays tend to improve traction and handling characteristics, the rear wheel of bicycles must exhibit a minimum amount of clearance between the wheel and all portions of the frame in order to meet safety standards such as CEN 14781 Section 4.10. Consequently, the length of chainstays, the maximum width of tires and the size of chain rings are limited in order to meet safety standards and to prevent the chain ring from interfering with the drive-side chainstay.

SUMMARY

The present invention provides a bicycle comprising a frame configured to support a rear wheel defining a first plane. The frame includes a bottom bracket and at least a drive-side chainstay configured to rotationally receive the rear wheel at a rear wheel rotational axis. The drive-side chainstay includes first, second and third tubular members each having front and rear ends. The second and third tubular member rear ends are joined to the first tubular member front end, and the second and third tubular member front ends are each connected to the bottom bracket. The second and third tubular member front ends are vertically spaced apart a first distance so as to define a cutout between the first tubular member front end, and the bottom bracket.

The rear wheel includes a tire mounted to a rim, the tire having a location of maximum lateral width. The rear wheel defines a wheel first radius extending between the rear wheel rotational axis and a radial point corresponding with the maximum lateral width of the tire. The drive-side chainstay is configured such that the wheel first radius overlaps with the cutout.

In one embodiment, the bicycle comprises a frame including a bottom bracket having a bottom bracket rotational axis and a drive-side chainstay. The drive-side chainstay includes first, second and third tubular members each including front and rear ends. The drive-side chainstay is connected to the bottom bracket at the second and third tubular member front ends and includes a wheel retention member configured to rotationally secure the rear wheel at the first tubular member rear end. The second and third tubular member rear ends are connected to the first tubular member front end. The second and third tubular member front ends are each connected to the bottom bracket and spaced apart from one another so as to define a cutout between the bottom bracket and the first tubular member front end.

The bottom bracket receives a crank assembly includes at least a first chain ring connected for rotation about the bottom bracket rotational axis. The chain ring defines a chain ring radius between the bottom bracket rotational axis and a circumferential edge. The cutout is sized so as to receive a portion of a circumference of the first chain ring.

Other aspects of the invention will become apparent by consideration of the detailed description and accompanying drawings.

DETAILED DESCRIPTION OF THE FIGURES

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
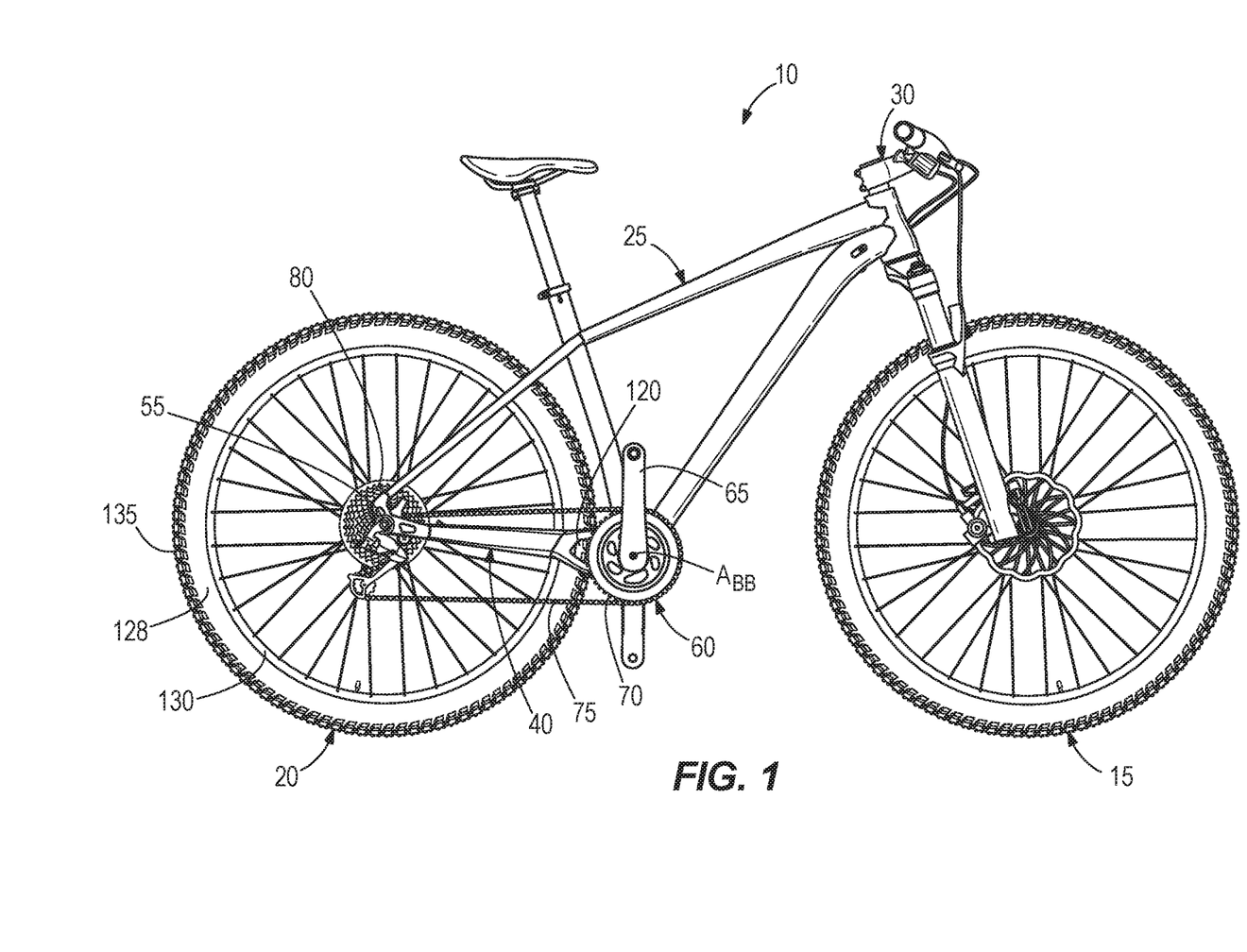
FIG. 1 shows a side view of a bicycle in accordance with the present disclosure.

FIG. 1 illustrates a bicycle 10 that includes front and rear wheels 15, 20, a frame 25 and a steering assembly 30. The frame 25 includes a bottom bracket shell 35 (FIG. 4) and a drive-side and non-drive-side chainstay 40, 45 (FIG. 6) are connected to the bottom bracket shell 35. The bottom bracket shell 35 includes a bottom bracket rotational axis $A_{BB}$. The chainstays rotationally receive the rear wheel at a rear wheel rotational axis $A_{RW}$. The bottom bracket shell 35 rotationally receives a crankset 60 at a spindle 62 (shown in phantom in FIGS. 4 and 6) that connects a pair of crank arms 65 and a first chain ring 70 that engage a chain 75. The chain 75 engages the rear wheel 20 through a series of rear sprockets 80 mounted to a hub (not shown) of the rear wheel.

The frame 25 facilitates using a commercially available crankset 60 having a larger chain ring 70 while utilizing shorter chainstays 60 that are configured to receive a rear wheel 20 having a wider tire than is feasible with prior art bicycles. The drive-side chainstay of prior art bicycles passes directly between the chainring and the tire. Commercially available cranksets typically include a spindle having one of several standard lengths, effectively fixing the position of the chain ring at a lateral distance from a centerline of the bicycle. In order to use commercially available cranksets, the width of chainstays on prior art bicycles must be spaced so that the drive-side chainstay does not to interfere with the chainring. Accordingly, prior art bicycles limit the width of the tire that may be used or undesirably lengthen the chainstays, because the chain ring, bottom bracket shell chainstays and tire must all fit in a compact area. While bicycles may utilize wider tires with shorter chainstays, the chainstays and bottom bracket shell must be widened in order to ensure sufficient clearance between the wheels and the frame. If the width of the bottom bracket falls between one of the standard spindle lengths, a custom crankset must be utilized, which increases the cost and complexity of commercially manufacturing the bicycle.

Figure 2:
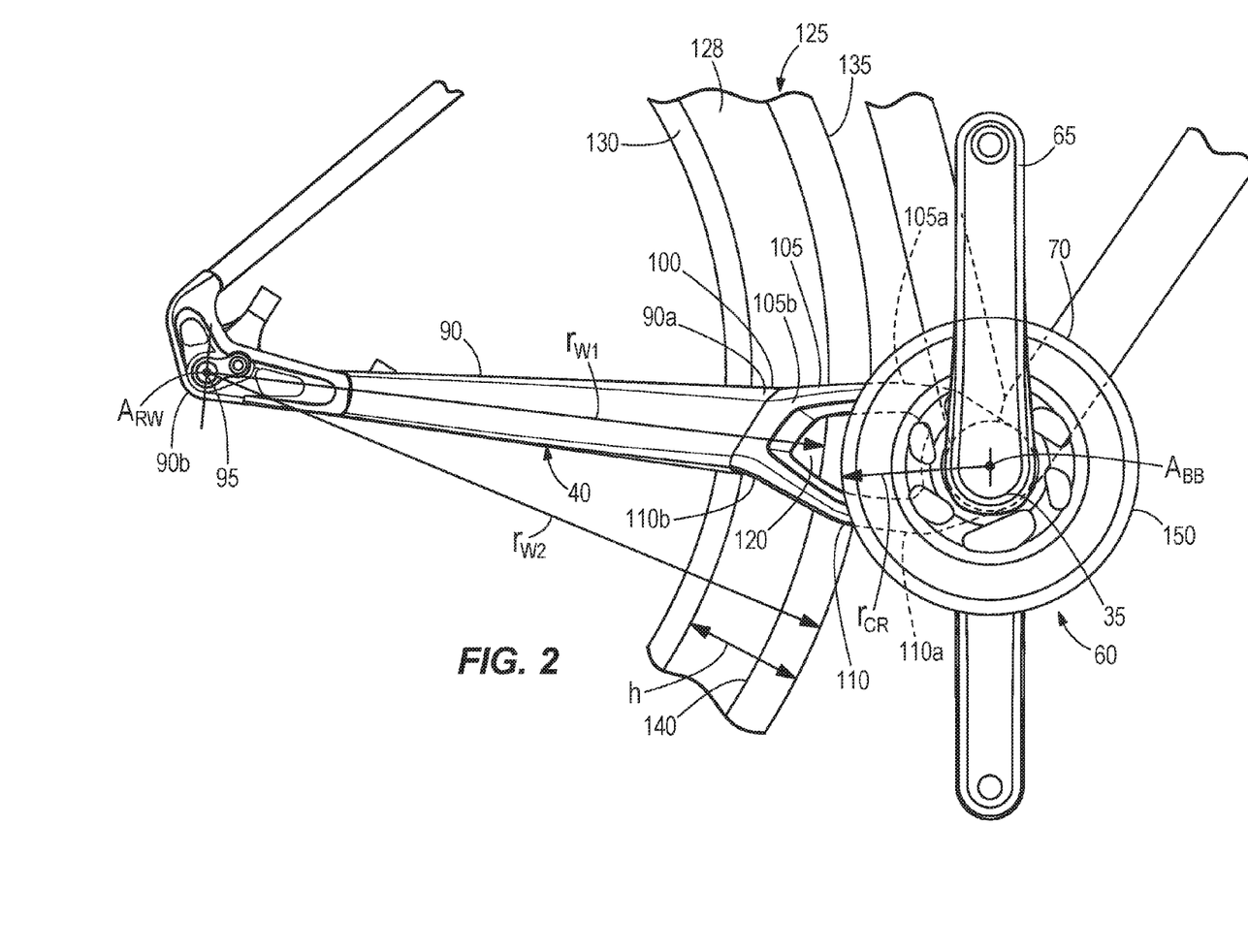
FIG. 2 shows an enlarged side view of the bicycle of FIG. 1, with particular emphasis on the bottom bracket and drive-side chainstay.

FIG. 2 shows a side view of a bicycle with particular emphasis on the drive-side chainstay 40 and the crankset 60, with the chain 75 omitted for clarity. The drive-side chainstay 40 includes first, second and third tubular members 90, 105 and 110, respectively. The first, second and third members each include front ends 90a, 105a and 110a, and rear ends 90b, 105b and 110b. The first tubular member 90 includes a rear wheel retention member 95 disposed at the rotational axis of the rear wheel $A_{RW}$ adjacent the first tubular member rear end 90b. The second and third tubular member rear ends 105b and 110b are joined to the first tubular member front end 90a at connection 100.

Figure 3:
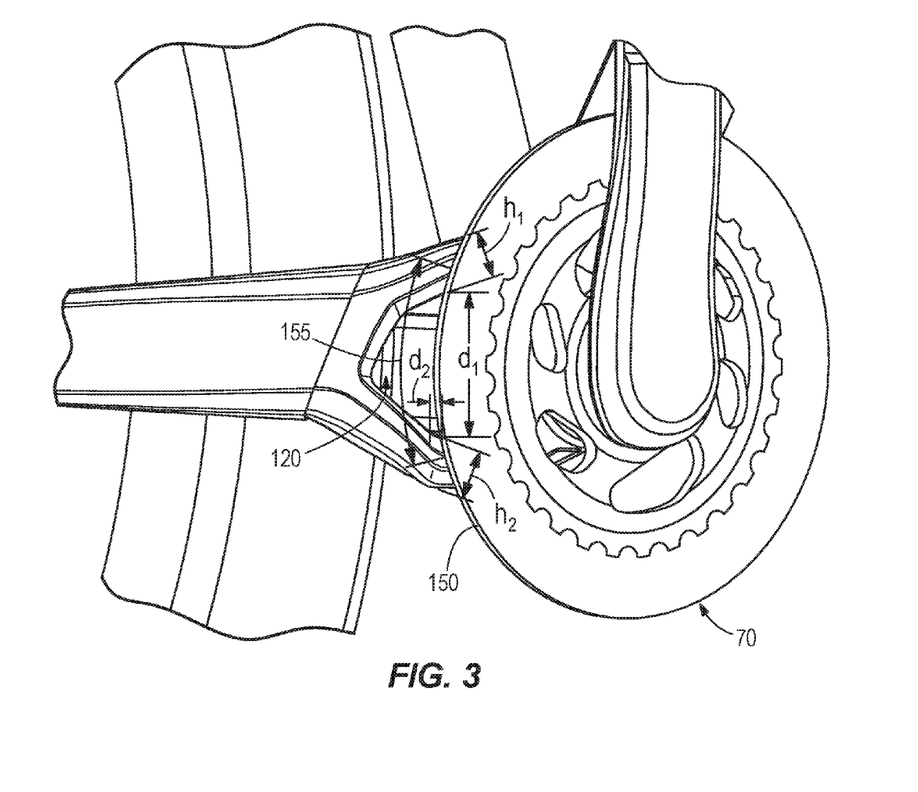
FIG. 3 shows a perspective view of the chainstay and crank assembly of the bicycle of FIG. 1.
Figure 5:
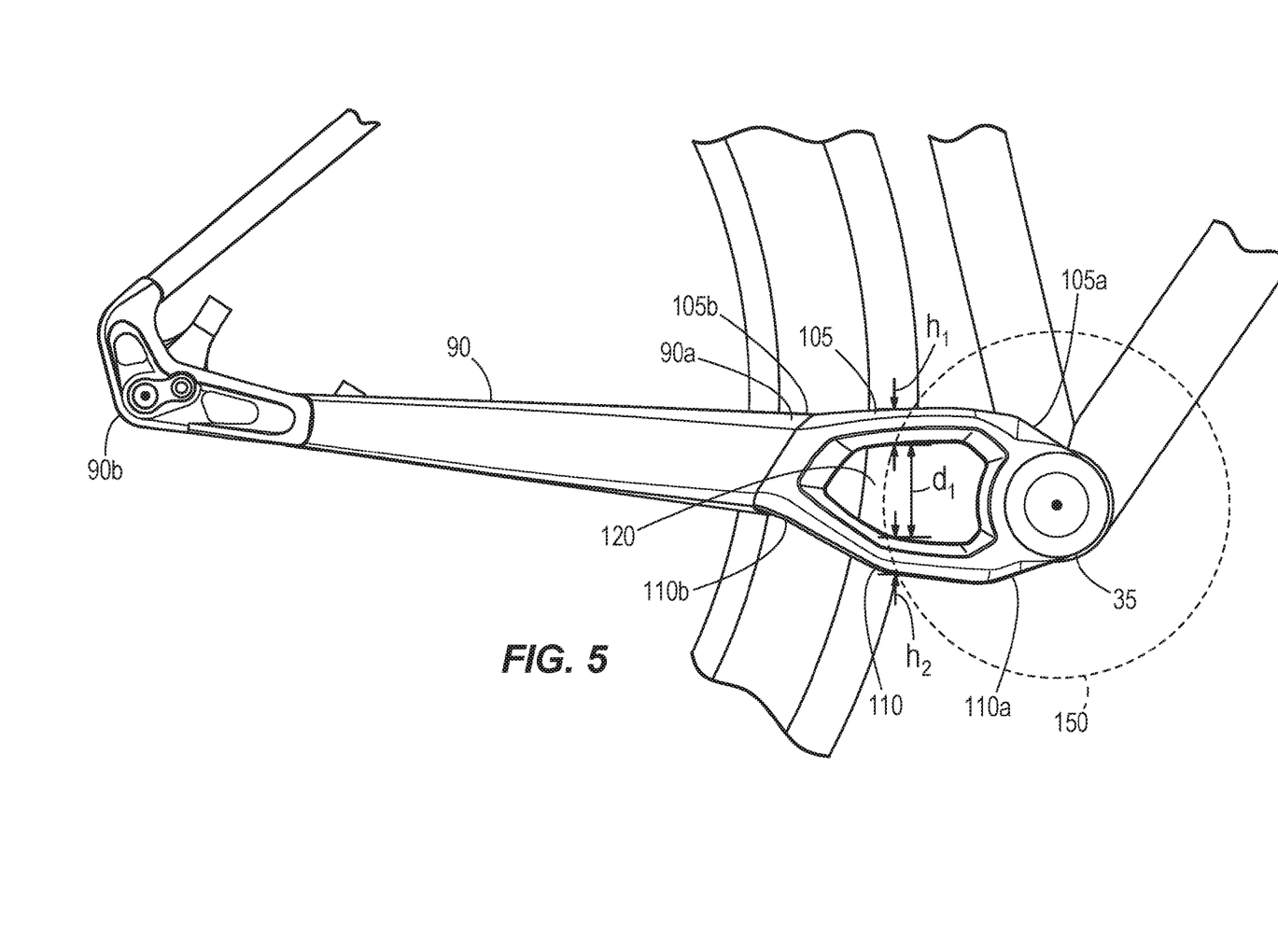
FIG. 5 shows an alternate enlarged side view of the chainstay and crank assembly shown in FIG. 2.

FIG. 3 is an enlarged view of the drive-side chainstay 40 with particular emphasis on a cutout 120 defined by the drive-side chainstay 40. The second and third tubular members 105, 110 have heights h1 and h2, respectively, and the second and third tubular member front ends 105a, 110a are connected to the bottom bracket shell 35 such that they are vertically spaced apart. As best seen in FIGS. 2 and 5, the second and third tubular members 105, 110 define the cutout 120 between the bottom bracket shell 35, and the connection 100 between the first tubular member front end 90a and the second and third tubular member rear ends 105b, 110b. Referring specifically to FIG. 5, the cutout 120 is sized such that a maximum vertical distance $d_1$ between the second and third tubular members 105, 110 at the point where they overlap with the chain ring 70 intermediate the second and third tubular member front and rear ends 105a, 105b, 110a, 110b. The vertical distance $d_1$ between the second and third tubular members 105, 110 is greater than the cumulative heights h1, h2 of the first and second tubular members 105, 110 at that location.

Referring specifically to FIG. 2, the chain ring 70 has a radius $r_{CR}$ as measured from the bottom bracket axis $A_{BB}$ to a circumferential edge 150 of the chain ring 70. The chain ring radius can be modified according to the strength and riding preference of the rider. For example, a stronger rider seeking speed and maximization of distance covered per revolution of the crank assembly would typically utilize a chain ring having a larger radius. Regardless of riding style and rider strength, the chain ring radius that can be mounted to prior art bicycles is limited by a combination of the geometry of the bicycle frame, the size of commercially available crank assemblies and the location of maximum tire width on the radius of the wheel.

Figure 4:
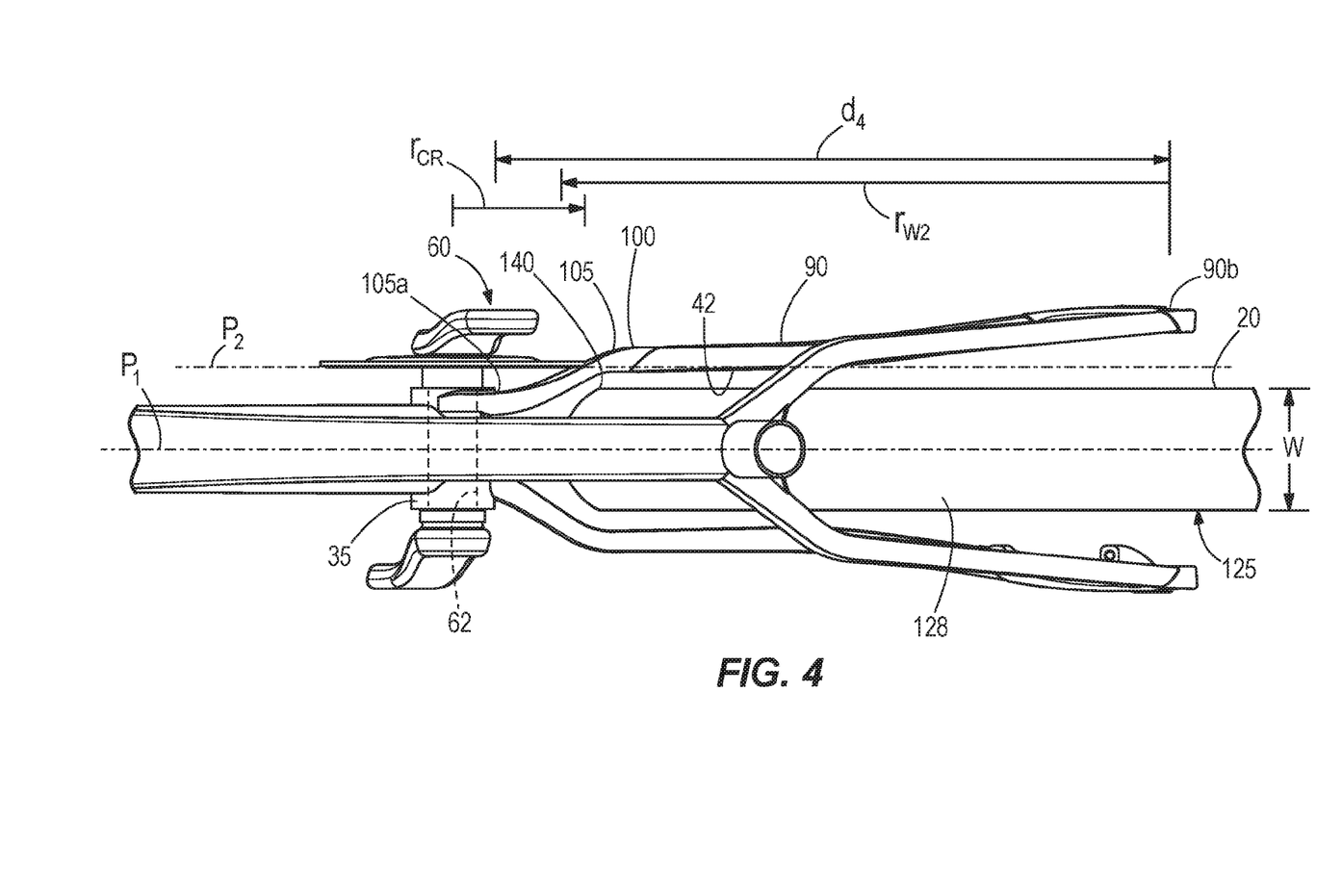
FIG. 4 shows a top view of a portion of the bicycle of FIG. 1.

With continued reference to FIG. 2, the rear wheel 20 includes a wheel first radius $r_{W1}$ measured between the wheel axle that is received by the dropout 95 and the point of maximum width 140 of the tire 125. The rear wheel 20 also includes a wheel second radius $r_{W2}$ measured between the wheel axle and the radially outermost surface of the wheel 135. As shown in FIGS. 2 and 4, a tire 125 mounted to the rear wheel has a width W and a height h measured along a sidewall 128 between a tire bead that is received by the wheel rim 130 (FIGS. 1 and 2) and a radially outermost surface of the wheel 135. In the illustrated embodiment, the width W is approximately 3 inches, or 76.2 mm, however the width W may be altered without departing from the scope of the invention. The point of maximum width 140 on traditional tires typically occurs at an intersection of the tire sidewall 128 and the radially outermost surface of the wheel 135, where the knobs project at an angle having a component in the lateral direction. As best seen in FIG. 2, the bicycle frame 25 is configured such that the cutout longitudinally overlaps with the wheel first radius $r_{W1}$. As used herein, "longitudinally overlaps" means overlapping in the longitudinal direction, which would be characterized by one object overlapping with another when viewed perpendicular (e.g., from the side) to the longitudinal axis.

FIG. 4 shows a top view of the rear portion of the bicycle 10, with the sprockets 80 omitted for clarity. The rear wheel defines a first vertical plane P1. The chainstay first tubular member 90 extends from the first tubular member rear end 90b to the connection 100 and is oriented at an angle to the first vertical plane P1, however the first tubular member 90 does not intersect the first vertical plane P1. The second and third tubular members 105, 110 extend from the connection 100 to the bottom bracket shell 35 and are oriented at a steeper angle relative to the first vertical plane P1 in comparison with the first tubular member 90. In the embodiment shown in FIG. 4, the chainring 70 defines a second plane P2 that is oriented parallel to and spaced laterally from the first plane P1. The second and third tubular members 105, 110 cross the second plane P2 adjacent the connection 100. Stated differently, the orientation of the drive-side chainstay 40 changes with respect to the first and second planes P1, P2 at the connection 100 between the first tubular member 90 and the second and third tubular members 105, 110.

With continued reference to FIG. 4, a chain line of the bicycle, which comprises a midpoint of the lateral width of a drivetrain of the bicycle 10, is coplanar with the second plane P2. The drivetrain includes the rear sprockets 80, a rear derailleur 82, the crank assembly 60 and the chain 75 (FIG. 1). The drivetrain may also include a front derailleur (not shown) in embodiments where the crank assembly includes more than one chain ring. The second plane P2 is located at a lateral midpoint between laterally outermost and laterally innermost chainrings in embodiments including more than one chainring. The cutout 120 is disposed longitudinally such that the cutout 120 begins rearward of where the outboard edge of the drive-side chainstay 40 intersects P2.

Figure 6:
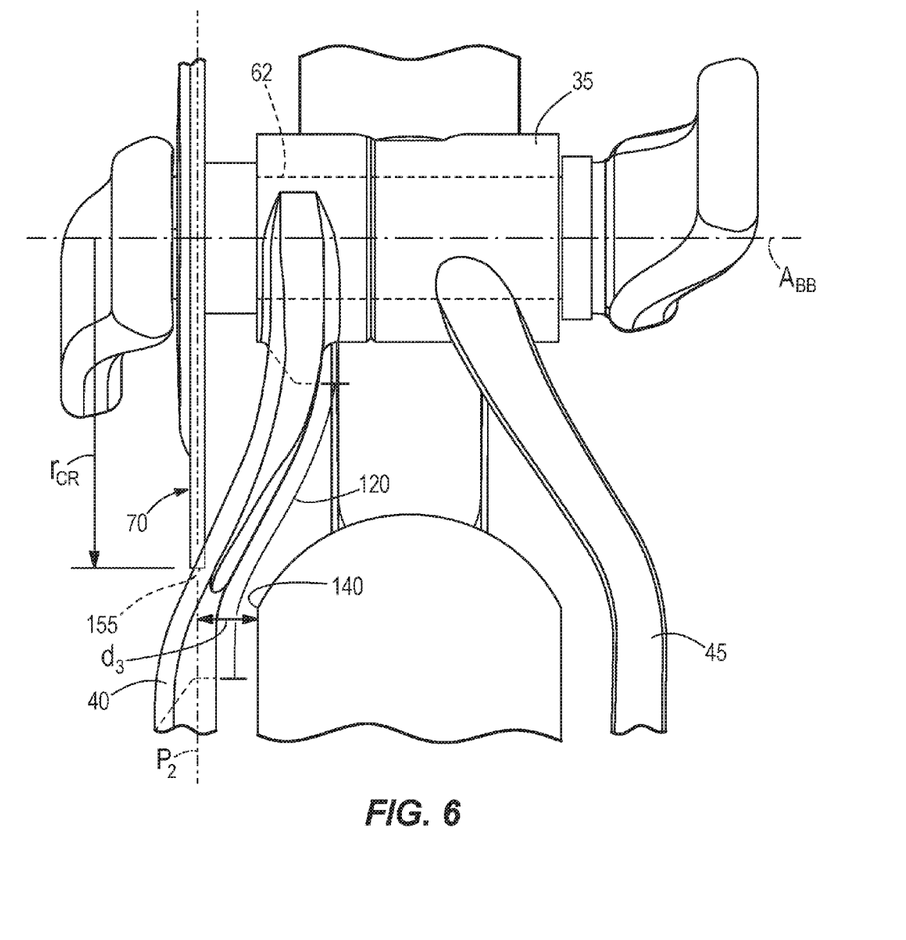
FIG. 6 shows an enlarged bottom view of a portion of the bicycle of FIG. 1 with particular emphasis on the bottom bracket and chainstays.

As best seen in FIG. 3, the second and third tubular members 105, 110 are shaped such that the chain ring 70 is laterally spaced a second distance $d_2$ from the second and third tubular members 105, 110. In the illustrated embodiment, the shape of the second and third tubular members 105, 110 provides sufficient clearance to ensure that the drive-side chainstay does not interfere with the chain ring 70. As best seen in FIGS. 3 and 6, the cutout 120 receives a portion 155 of the circumferential edge 150 of the chain ring 70.

Referring to FIG. 3, the drive-side chainstay 40 is configured such that the cutout 120 is defined at a point where the circumferential edge 150 of the chain ring 70 and the point of maximum width 140 of the tire are laterally closest to one another. Moreover, the longitudinal distance between the circumferential edge of the chain ring 150 and the point of maximum width 140 of the tire is approximately 15 mm.

As shown in FIG. 4, the drive-side chainstay 40 is configured such that a distance $d_4$ between the rear end of the first chainstay 90b and the front end of the second or third tubular member 105a, 110a as measured in a direction parallel to the first and second planes P1, P2 is approximately equal to or shorter than a combined length of the chain ring radius $r_{CR}$ and the wheel second radius $r_{W2}$. In the illustrated embodiment, there is approximately 5 mm difference between the length of the drive-side chainstay 40 and the combined length of the chain ring radius $r_{CR}$ and wheel second radius $r_{W2}$. Furthermore, the wheel second radius $r_{W2}$ overlaps with the chain ring radius $r_{CR}$ when viewed from the side (see also FIG. 2).

In the illustrated embodiment, the longitudinal distance between the bottom bracket rotational axis $A_{BB}$ and the point where the drive-side chainstay intersects the second plane P2 is approximately equal to or slightly shorter than the chain ring radius $r_{CR}$ (see FIG. 6). This configuration of the drive-side chainstay 40 and the cutout 120 allows for a reduction in the lateral distance between the second plane P2 and the point of maximum width of the tire 140. The point of maximum width of the tire 140 is spaced a third distance $d_3$, laterally from the second plane P2. In the embodiment shown in FIG. 6, $d_3$ is approximately 6 mm.

The configuration of the drive-side chainstay 40 ensures that the clearance between the point of maximum width 140 of the tire and the first and second tubular members 105, 110 meets safety standards. The configuration of the drive-side chainstay 40 also allows the chainstays to be shortened for a bicycle including a wheel having a given second radius $r_{W2}$ and tire width w while simultaneously allowing for use of a chain ring 70 having a larger chain ring radius $r_{CR}$ than with prior art bicycles. Stated differently, the cutout 120 ensures that the chainstay 40 has sufficient structural strength, while maintaining free space between the circumferential edge 150 of the chain ring 70 and the point of maximum width 140 of the tire. Accordingly, the width w of the tires at the point of maximum width 140 can be increased without resorting to a bottom bracket 35 having a custom width and a crankset 60 having a custom length spindle 62 because the cutout 120 receives the circumferential edge 150 of the chain ring 70.

Various features and advantages of the invention are set forth in the following claims.

The invention claimed is:

1. A bicycle comprising:
a rear wheel including a rear wheel rotational axis;
a frame including a bottom bracket having a bottom bracket rotational axis, a drive-side chainstay including a wheel retention member configured to rotationally secure the rear wheel, and coupled to the bottom bracket such that a cutout is defined through the drive-side chainstay; and
a crank assembly rotationally received by the bottom bracket and including at least a first chain ring connected for rotation about the bottom bracket rotational axis and having a chain ring radius between the rotational axis and a circumferential edge of the chain ring; wherein only a portion of the circumferential edge of the first chain ring extends into the cutout.

2. The bicycle of claim 1, wherein the rear wheel includes a tire having a location of maximum lateral width, the rear wheel defining a wheel first radius extending radially between a rear wheel rotational axis and the location of maximum lateral width of the tire and the drive-side chainstay is configured such that the wheel first radius longitudinally overlaps with the cutout.

3. The bicycle of claim 1, wherein the rear wheel defines a second radius between the rear wheel rotational axis and a radially outermost point of the tire, and the drive-side chainstay is configured such that the chain ring radius and the wheel second radius overlap when viewed from a side.

4. The bicycle of claim 3, wherein a combined length of the wheel second radius and the chain ring radius is longer than a length of the drive-side chainstay by between approximately 5 mm and approximately 10 mm.

5. The bicycle of claim 1, wherein the rear wheel defines a first plane, and the drive-side chainstay is oriented at a steeper angle with respect to the first plane at the cutout than rearward of the cutout.

6. The bicylcle of claim 1, wherein the chain ring defines a second plane, and the drive-side chainstay crosses the second plane such that a portion of the drive-side chainstay intersects the chainring radius.

7. The bicycle of claim 1, wherein the driveside chainstay includes two tubular members that are vertically spaced such that the cutout is defined through the chainstay.

8. A bicycle comprising:
a rear wheel including a rear wheel rotational axis;
a frame including a bottom bracket having a bottom bracket rotational axis, a drive-side chainstay including upper and lower members connected to the bottom bracket and vertically spaced apart so as to define a cutout adjacent the bottom bracket between the upper and lower members, and a wheel retention member configured to rotationally secure the rear wheel; and
a crank assembly rotationally received by the bottom bracket and including at least a first chain ring connected for rotation about a bottom bracket rotational axis and having a chain ring radius between the rotational axis and a circumferential edge of the chain ring; wherein only a portion of the circumferential edge of the first chain ring extends into the cutout.

9. The bicycle of claim 8, wherein the rear wheel includes a tire having a location of maximum lateral width, the rear wheel defining a wheel first radius extending radially between a rear wheel rotational axis and a location of maximum lateral width of the tire and the drive-side chainstay is configured such that the wheel first radius longitudinally overlaps with the cutout.

10. The bicycle of claim 8, wherein the rear wheel defines a second radius between a rear wheel rotational axis and a radially outermost point of the tire, and the drive-side chainstay is configured such that the chain ring radius and the wheel second radius overlap when viewed from the side.

11. The bicycle of claim 10, wherein a combined length of the wheel second radius and the chain ring radius is longer than a length of the drive-side chainstay by between approximately 5 mm and approximately 10 mm.

12. The bicycle of claim 8, wherein the rear wheel defines a first plane, and drive-side chainstay is oriented at a steeper angle with respect to the first plane at the cutout than rearward of the cutout.

13. The bicycle of claim 8, wherein the chain ring defines a second plane, and the drive-side chainstay crosses the second plane such that a portion of the drive-side chainstay intersects the chain ring radius.

* * * * *